United States Patent [19]
Schultz

[11] Patent Number: 5,549,467
[45] Date of Patent: Aug. 27, 1996

[54] APPARATUS FOR CUTTING ELLIPSES FROM DOUGH

[76] Inventor: George A. Schultz, 176 Ohio St., New Braunfels, Tex. 78130

[21] Appl. No.: 327,862

[22] Filed: Oct. 24, 1994

[51] Int. Cl.⁶ .............................. A21C 11/00; B26F 1/00
[52] U.S. Cl. ........................ 425/298; 83/673; 425/315; 426/503
[58] Field of Search ................................ 425/294, 298, 425/315, 316, 362, 363; 83/672, 673, 675; 426/503

[56] References Cited

U.S. PATENT DOCUMENTS

| | | | |
|---|---|---|---|
| 5,174,185 | 12/1992 | Aichele | 83/673 |
| 5,306,133 | 4/1994 | Dayley | 425/298 |

FOREIGN PATENT DOCUMENTS

| | | | |
|---|---|---|---|
| 2174033 | 10/1986 | United Kingdom | 425/298 |

Primary Examiner—George Yeung
Attorney, Agent, or Firm—Donald R. Comuzzi; Christopher L. Makay

[57] ABSTRACT

An apparatus for processing a batch of dough includes a housing that supports a conveyor, a press, and a cutter. The apparatus further includes a drive motor for the conveyor and press. Upon the placement of a batch of dough on the conveyor, the conveyor feeds the batch of dough to the press. The press squeezes the batch of dough against the conveyor to compress it into a thin flat sheet. After the batch of dough has been compressed, the conveyor feeds the flat thin flat sheet to the cutter. The cutter includes an elliptically shaped cutting edge so that, as the flat thin sheet of dough passes underneath the cutter, the cutter cuts ellipses of dough for delivery to a baking device. The motor forms part of a chain drive system that drives the conveyor in an endless loop and, further, drives the press to compress the batch of dough into the thin flat sheet.

9 Claims, 4 Drawing Sheets

APPARATUS FOR CUTTING ELLIPSES FROM DOUGH

BACKGROUND OF THE INVENTION

1. Field of the Invention

The present invention relates to an apparatus that forms flat thin ellipses of dough from a batch of dough.

2. Description of the Related Art

Baked flat thin disks of dough (e.g., tortillas or pita bread) are an extremely popular food sold in restaurants, especially Mexican or Greek establishments, as well grocery stores and the like. For example, many restaurants and stores serve homemade tortillas either individually with meals or packaged for volume sales. However, homemade tortillas require several employees to perform the steps of separating the dough into discrete balls, pressing each individual ball of dough into a flat thin disk using a roller, and then cooking the dough on a hot surface. Producing tortillas individually is, therefore, extremely time and labor intensive which makes the use of employees impractical for operations serving high volumes of customers. Thus, most restaurants, stores, and the like do not serve fresh homemade tortillas.

Accordingly, an apparatus which automatically presses dough balls and then cooks the resulting flat thin disks into tortillas would benefit a variety of food service operations. U.S. Pat. No. 4,683,813, issued on Sep. 6, 1988 to Schultz, discloses an apparatus that includes a housing containing a rotisserie having three baking plates and a cooling plate. The housing further includes a burner positioned beneath each of the three baking plates to heat those plates, resulting in the baking of flat thin disks of dough residing on a particular plate. A conveyor connects to the housing to sequentially deliver dough balls onto the top baking plate so that a press plate presses each of the sequentially delivered dough balls into a flat thin disk to form a tortilla.

In operation, an employee separates a batch of dough into discrete dough balls and then places them in a line on the conveyor. The conveyor sequentially delivers the dough balls onto the top baking plate where the press plate systematically raises and lowers to sequentially press the dough balls into flat thin disks. A motor driven gear system drives a shaft connected to each of the four plates to rotate them. Thus, after the pressing of each dough ball, the top baking plate rotates so that the conveyor delivers the next dough ball beneath the press plate.

As the top baking plate fully rotates, a deflector positioned over the plate flips each flat thin disk to deposit the disks sequentially onto a slide that delivers them to the next baking plate. The next baking plate also rotates the flat thin disks over a burner to cook the second side of each flat thin disk. When that baking plate fully rotates, the flat thin disks contact a similar deflector that flips them onto a slide that delivers them onto the next baking plate. That final baking plate finishes the cooking of the first side of each flat thin disk and then delivers the flat thin disks to the cooling plate using a similar deflector and slide. The cooling plate rotates to permit each of the flat thin disks to cool before utilizing a deflector and slide to place the baked flat thin disks onto a second conveyor that permits restaurant personnel to retrieve the cooked flat thin disks for either storage or immediate delivery to restaurant customers.

Unfortunately, although the apparatus disclosed in U.S. Pat. No. 4,683,813 eliminates much of the time and labor intensive steps normally required in forming and baking flat thin disks of dough, that apparatus still requires the constant supervision of at least one employee. That employee must constantly form the dough balls and place them sequentially onto the conveyor. Thus, any food service operation utilizing the apparatus of U.S. Pat. No. 4,683,813 must hire an additional person whose sole responsibility is to monitor the apparatus and place dough balls onto the conveyor.

Accordingly, and apparatus that forms flat thin disks of dough from a batch of dough and feeds the flat thin disks to a cooking device would be highly desirable.

SUMMARY OF THE INVENTION

In accordance with the present invention, an apparatus for processing a batch of dough includes a housing that supports a conveyor, a press, and a cutter. The apparatus further includes a drive motor for the conveyor and press. Upon the placement of a batch of dough on the conveyor, the conveyor feeds the batch of dough to the press. The press squeezes the batch of dough against the conveyor to compress it into a thin flat sheet. After the batch of dough has been compressed, the conveyor feeds the flat thin flat sheet to the cutter. The cutter includes an elliptically shaped cutting edge so that, as the flat thin sheet of dough passes underneath the cutter, the cutter cuts ellipses of dough that shrink to circular disks prior to delivery to a baking device. The motor forms part of a chain drive system that drives the conveyor in an endless loop and, further, drives the press to compress the batch of dough into the thin flat sheet.

The cutter includes the elliptically shaped cutting edge that forms ellipses of dough to ensure the dough assumes a circular shape. An elliptically shaped cutting edge is required because the press flattens the batch of dough along only one direction so that, after cutting, the dough shrinks back along only that one direction. Consequently, the major axis of the ellipse is along the direction of stretching of the dough so that the ellipses shrink to completely circular disks prior to delivery to a baking device.

It is, therefore, an object of the present invention to provide an apparatus for processing a batch of dough into elliptical shapes that ensure circular disks are formed for baking.

Still other objects, features, and advantages of the present invention will become evident to those skilled in the art in light of the following.

DETAILED DESCRIPTION OF THE PREFERRED EMBODIMENT

Figure 1:
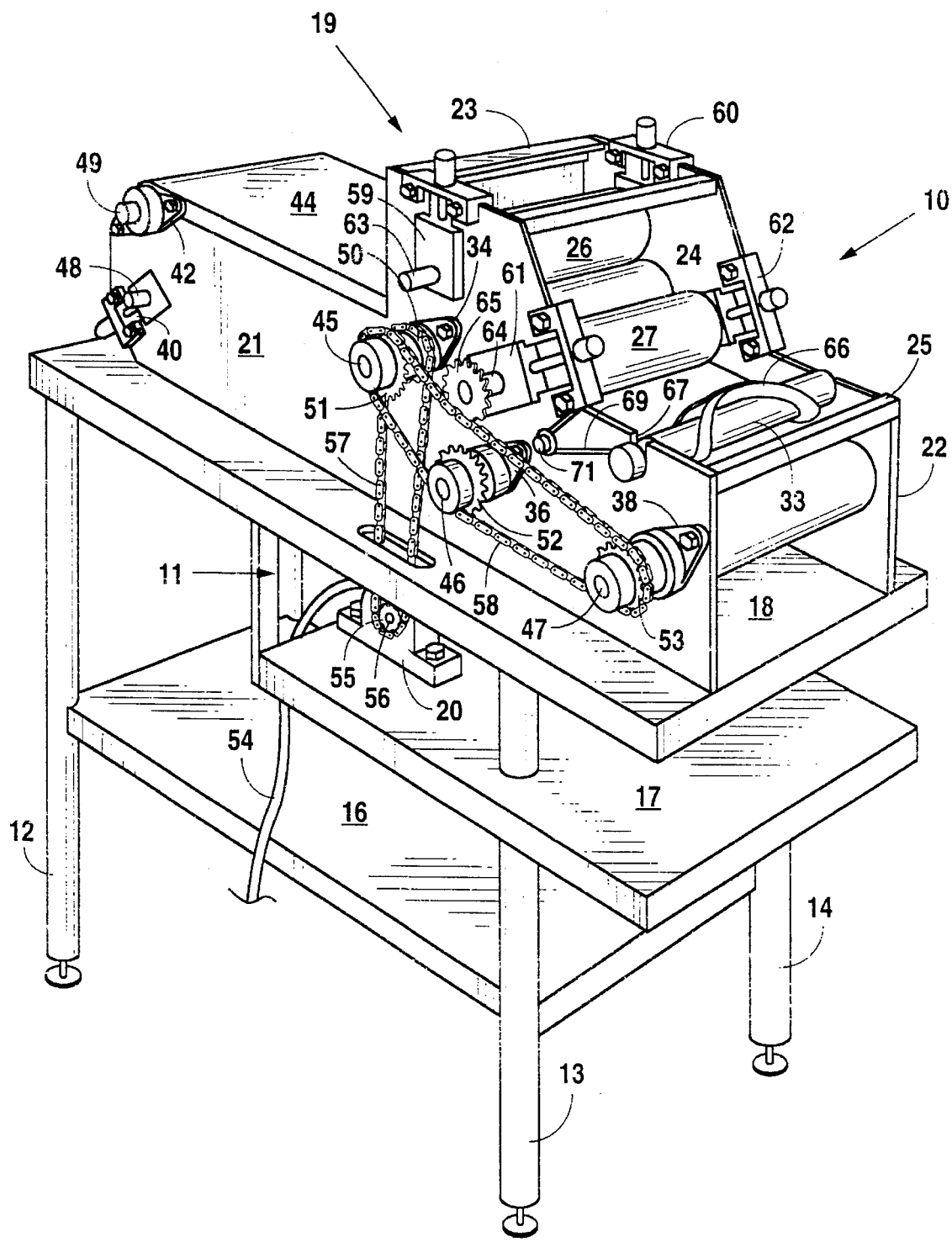
FIG. 1 is a perspective view illustrating the apparatus for forming flat thin disks of dough from a batch of dough.
Figure 2:
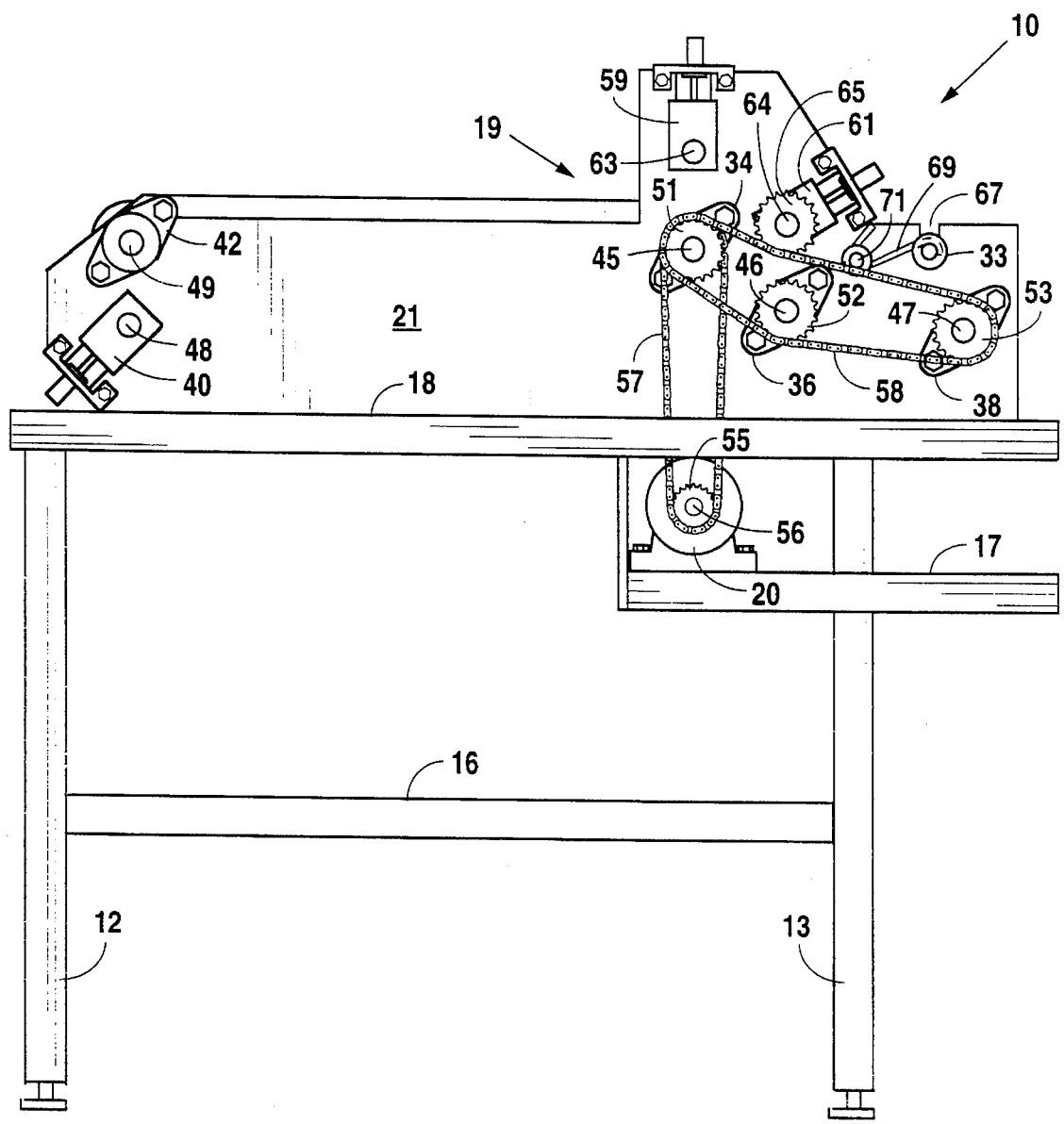
FIG. 2 is a left side plan viewed illustrating the apparatus for forming flat thin disks of dough from a batch of dough.
Figure 3:
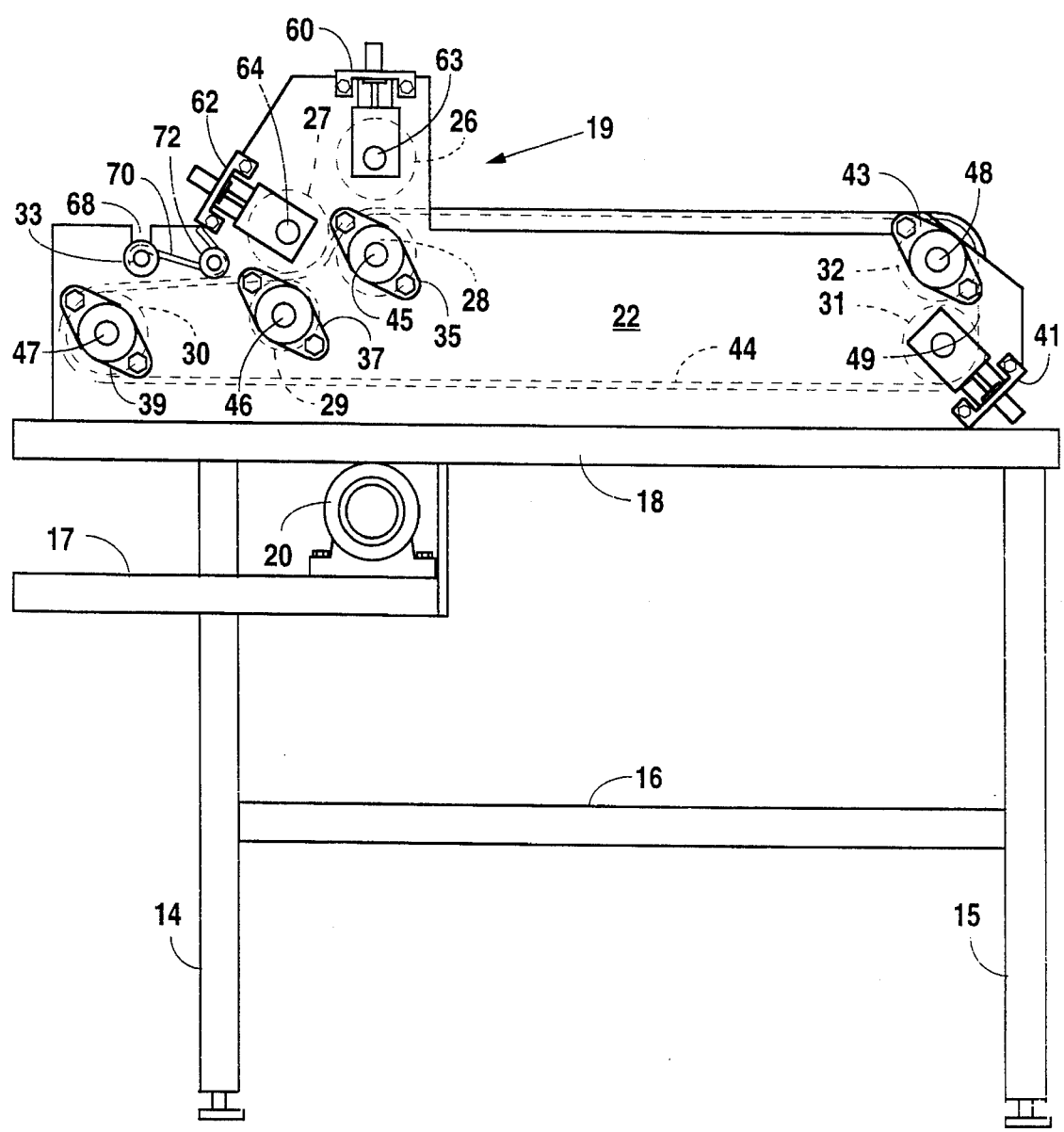
FIG. 3 is a right side plan view illustrating the apparatus for forming flat thin disks of dough from a batch of dough.

As illustrated in FIGS. 1–3, apparatus 10 for forming flat thin disks of dough from a batch of dough includes housing 19 and drive motor 20. Frame 11 supports both housing 19 and drive motor 20 and includes legs 12–15 that support shelves 16–18. Housing 19 includes sidewalls 21 and 22 which are connected via braces 23 and 25. Sidewalls 21 and 22 support rollers 26–32 and cutter 33.

Rollers 28–32 connect between sidewalls 21–22 using pairs of brackets 34–43, respectively. Each of brackets 34–43 mounts to its respective sidewall 21 or 22 using any suitable means such as screws or nuts and bolts. Furthermore, each of rollers 28–32 includes a shaft 45–49, respectively, that fits through a bearing located within each of brackets 34–43 that permits the rotation of a respective shaft 45–49 of rollers 28–43 within a respective bracket 34–43.

Housing 19 includes rollers 28–32 to support belt 44 so that a conveyor is formed within housing 19. Rollers 31 and 32 are passive rollers that support belt 44 at the back end of housing 19. Conversely, rollers 28–30 are active rollers that drive belt 44 in an endless loop. Consequently, sprockets 50 and 51 mount onto shaft 45 of roller 28, sprocket 52 mounts onto shaft 46 of roller 29, and sprocket 53 mounts onto shaft 47 of roller 30 to permit the rotary driving of rollers 28–30 by motor 20.

In this preferred embodiment, motor 20 is an electric motor that connects to any suitable power source such as an electric outlet via power cord 54 (see FIG. 1). Motor 20 attaches to shelf 17 using any suitable means such as screws or nuts and bolts. Motor 20 includes sprocket 55 mounted on shaft 56 and chain 57 mounted about sprocket 55 and sprocket 50 of roller 28 to permit the driving of roller 28 by motor 20. Chain 58 mounts about sprockets 51, 52, and 53 of rollers 28, 29, and 30, respectively, to transfer the rotary force of motor 22 to rollers 29 and 30. Accordingly, as motor 20 drives roller 28 via chain 57 and sprockets 50 and 55 and rollers 29 and 30 via chain 58 and sprockets 51–53, rollers 28–30 transfer their rotary force to belt 44 to drive belt 44 in a endless loop about rollers 28–32.

Rollers 26 and 27 connect between sidewalls 21 and 22 utilizing brackets 59–62, respectively. Each of brackets 59–62 mounts to its respective sidewall 21 or 22 using any suitable means such as screws or nuts and bolts. Furthermore, each of rollers 26 and 27 includes a shaft 63 and 64, respectively, that fits through a bearing located within each of brackets 59–62 that permits the rotation of a respective shaft 62 and 63 of rollers 26 and 27 within a respective bracket 59–62.

Sprocket 65 mounts onto shaft 64 of roller 27 and engages chain 58 so that as motor 20 drives chain 58 as previously described, chain 58 transfers the rotary force of motor 20 to roller 27. Housing 19 includes rollers 26 and 27 to press a batch of dough into a flat thin sheet. That is, as rollers 28–30 drive belt 44 to convey a batch of dough towards roller 26, roller 26 initially flattens the batch of dough as belt 44 carries the batch of dough under roller 26. Roller 27 provides a final compression of the batch of dough into a flat thin sheet. That is, as belt 44 feeds the batch of dough underneath roller 27, drive motor 20 rotates roller 27 as previously described such that roller 27 compresses the initially flattened batch of dough into a thin flat sheet. Roller 27 compresses the initially flattened batch of dough into a flat thin sheet because it resides on top of belt 44.

After the compression of the initially flattened batch of dough into a flat thin sheet, belt 44 conveys the flat thin sheet to cutter 33. Cutter 33 includes a roller having cutting edge 66 mounted thereabout to cut ellipses from the flat thin dough sheet fed to it by belt 44. Cutter 33 includes an annular groove proximately adjacent each of its ends to permit the mounting of cutter 33 between sidewalls 21 and 22. Sidewalls 21 and 22 include slots 67 and 68, respectively, which receive a respective annular groove of cutter 33 therein to allow the placement of cutter 33 between sidewalls 21 and 22. Sidewalls 21 and 22 each include a flat spring 69 and 70, respectively, that fits within a respective annular groove of cutter 33 to hold cutter 33 and tension it against belt 44. Flat springs 69 and 70 mount to respective sidewalls 21 and 22 using any suitable means such bolts 71 and 72, respectively, and a corresponding nut. Thus, as roller 27 and belt 44 convey the flat thin dough sheet towards roller 33, the dough sheet contacts roller 33 and rotates it such that cutting edge 66 sequentially cuts flat thin dough ellipses which shrink to circular disks prior to delivery to a baking apparatus.

To supply apparatus 10 with a batch of dough, a standard rotary mixer pivotally mounts on a frame positioned above apparatus 10 so that, after a batch of dough is prepared, the mixer may be pivoted to deposit the batch of dough onto belt 44. The pivoting of the mixer to deposit the batch of dough onto belt 44 may be accomplished manually by a user of apparatus 10 or, alternatively, a drive motor could be employed. If a drive motor is employed, its activation is controlled by a timer so that, once the ingredients of the dough have been placed into the mixer, the mixing and delivery of dough onto belt 44 occurs automatically.

After the depositing of the batch of dough onto belt 44, motor 20 activates to drive roller 27 and rollers 28–30 as previously described. Motor 20 could also be controlled by the timer so that it activates immediately after the mixer pivots to deposit the batch of dough onto belt 44. Rollers 28–30 drive belt 44 in an endless loop including rollers 31 and 32, resulting in the delivery of the batch of dough to roller 26. Roller 26 initially flattens the batch of dough so that roller 27 can easily press the batch of dough into a flat thin sheet. The positioning of roller 27 between rollers 28 and 29 such that it contacts belt 44 ensures the initially flattened batch of dough is compressed into an extremely flat thin sheet before belt 44 delivers the batch of dough to cutter 33.

Figure 4A:
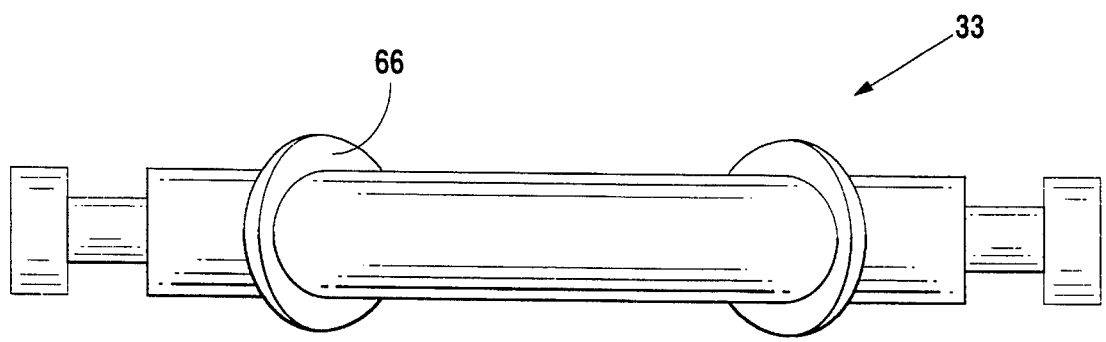
FIGS. 4A–C illustrate the cutter utilized to form the flat thin disks of dough from a batch of dough.
Figure 4B:
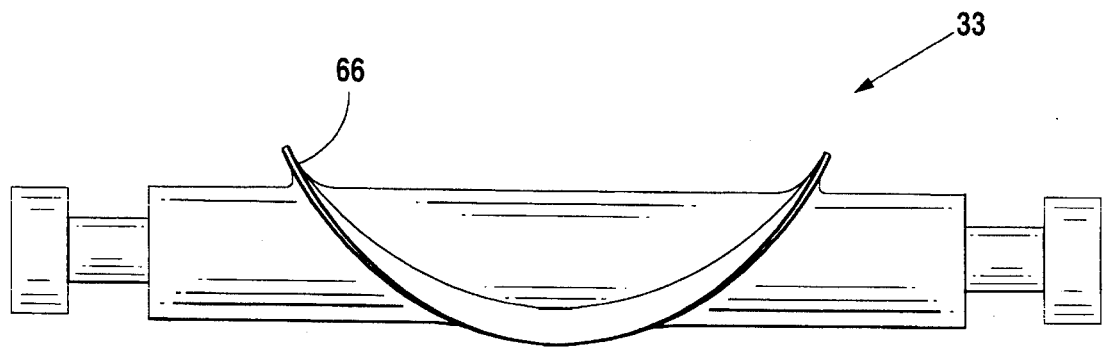
Figure 4C:
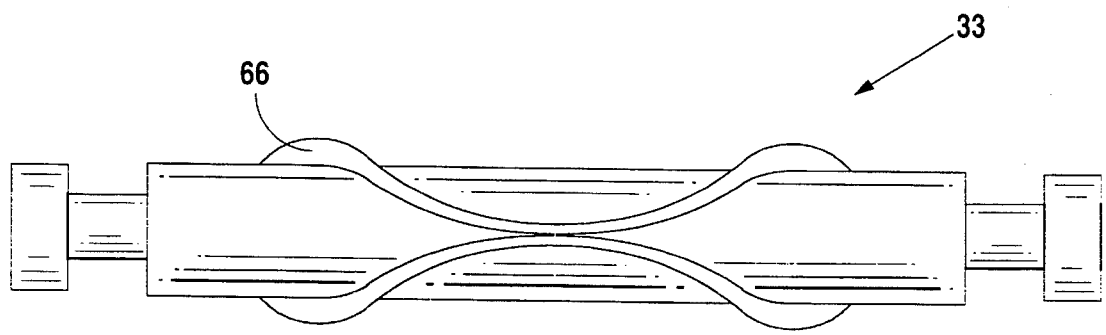

Referring to FIGS. 4A–C, the design of cutter 33 will be described. The problem encountered with utilizing a roller system to compress batches of dough into flat thin sheets is that the compression of a batch of dough occurs in only a single direction. That is, dough compression rollers such as rollers 26 and 27 rotate in only one direction, resulting in the batches of dough stretching in only one direction. When a batch of dough is stretched in only one direction, it shrinks back only along that same direction. Thus, when circular shapes are desired (e.g., tortillas), the problem of how to produce a completely circular disk even though the dough does not shrink uniformly arises. If a batch of dough is compressed manually, it is rolled in a variety of different directions so that it shrinks uniformly. However, it is impossible for compression rollers such as rollers 26 and 27 to compress a batch of dough along multiple directions.

Accordingly, cutting edge 66 must provide a shape that cuts flat thin sheets of dough into a shape that will produce a circular disk after cutting. If cutting edge 66 were circular in shape, the dough would shrink to produce an oblong shape. Therefore, cutting edge 66 is elliptical in shape so that it cuts the flat thin sheet of dough into an ellipse having its major axis parallel to the direction that rollers 26 and 27 compress the batch of dough. In this preferred embodiment, the major axis of the ellipse forming cutting edge 66 is 40% longer than its minor axis because that ratio results in the ellipses of dough shrinking to circular disks after cutting.

Consequently, in operation, as belt 44 feeds the flat thin sheet of dough towards cutter 33, the sheet of dough contacts cutter 33 to rotate cutter 33. As cutter 33 rotates, cutting edge 66 sequentially cuts ellipses of dough from the flat thin sheet of dough. After cutting, the ellipses of dough, shrink into circular disks along the axis of compression of the flat thin sheet of dough. Belt 44 then sequentially delivers the circular disks of dough to a slide (not shown) that communicates them to a baking apparatus.

Any suitable baking apparatus may be utilized, for example, the apparatus disclosed in U.S. Pat. No. 4,683,813 may be used once the conveyor and press plate are removed. The slide delivers the ellipses of dough onto the top baking plate where cooking begins. As previously described, the circular disks of dough are transferred to subsequent baking plates until the completion of baking, whereupon the cooked disks are delivered to a storage area for either packaging or customer consumption. After the cutting of the ellipses of dough, they shrink only along the major axis of the ellipse due to stretching of the batch of dough in a single direction. Thus, upon the finishing of the baking process, circular disks will always be formed.

Although in forming the dough ellipses a portion of a flat thin sheet of dough is not utilized, that portion is not wasted because a catch basin may be placed directly underneath the end of belt 44. Thus, as belt 44 reaches its reversal point at roller 30, it propels the unused dough into the catch basin where it collects for reuse. That is, when a sufficient amount of dough collects, it maybe remixed into a large dough ball and replaced on belt 44 where the above described process begins again. Accordingly, with the use of a catch basin, very little dough will be wasted even though apparatus 10 automatically operates.

Although the present invention has been described in terms of the foregoing embodiment, such description has been for exemplary purposes only and, as will be apparent to those of ordinary skill in the art, many alternatives, equivalents, and variations of varying degrees will fall within the scope of the present invention. That scope, accordingly, is not to be limited in any respect by the foregoing description, rather, it is defined only by the claims which follow.

I claim:

1. An apparatus for processing a batch of dough, comprising:

a housing;

a press mounted within said housing for pressing the batch of dough into a flat thin sheet;

a cutter mounted within said housing for cutting ellipses of dough from the flat thin sheet of dough wherein said ellipses of dough shrink into circular disks along the axis of pressing of the flat thin sheet;

a conveyor mounted within said housing for conveying the batch of dough to said press and then the flat thin sheet of dough to said cutter; and means for driving said conveyor and said press.

2. The apparatus according to claim 1 wherein said cutter comprises a roller including an elliptically shaped cutting edge having its major axis perpendicular to said roller.

3. The apparatus according to claim 2 wherein said major axis of said elliptically shaped cutting edge is 40% longer than its minor axis.

4. The apparatus according to claim 1 wherein said press comprises at least one roller.

5. The apparatus according to claim 1 wherein said conveyor comprises an endless belt supported by at least two rollers.

6. The apparatus according to claim 1 wherein said means for driving comprises a chain drive system powered by a motor and connected to both said conveyor and said press.

7. The apparatus according to claim 1 further comprising a frame that supports said housing.

8. An apparatus for cutting dough to produce circular disks after cutting, comprising:

a roller; and an elliptically shaped cutting edge mounted about said roller wherein the major axis of said elliptically shaped cutting edge is located perpendicular to said roller to allow cut ellipses of dough to shrink into circular disks.

9. The apparatus according to claim 8 wherein said major axis of said elliptically shaped cutting edge is 40% longer than its minor axis.

* * * * *